United States Patent
Li et al.

(10) Patent No.: US 11,609,672 B1
(45) Date of Patent: Mar. 21, 2023

(54) TOUCH CONTROL SUBSTRATE AND PREPARATION METHOD THEREOF, TOUCH CONTROL MODULE AND DISPLAY DEVICE

(71) Applicant: Institute of Semiconductors, Guangdong Academy of Sciences, Guangdong (CN)

(72) Inventors: Zibai Li, Guangdong (CN); Yao Wang, Guangdong (CN); Chuan Hu, Guangdong (CN); Boqian Chen, Guangdong (CN); Zhitao Chen, Guangdong (CN)

(73) Assignee: Institute of Semiconductors, Guangdong Academy of Sciences, Guangzhou (CN)

( * ) Notice: Subject to any disclaimer, the term of this patent is extended or adjusted under 35 U.S.C. 154(b) by 0 days.

(21) Appl. No.: 17/654,524

(22) Filed: Mar. 11, 2022

(30) Foreign Application Priority Data

Nov. 22, 2021 (CN) .......................... 202111382106.9

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01)

(58) Field of Classification Search
CPC ................. G06F 3/0446; G06F 3/0412; G06F 2203/04112
See application file for complete search history.

(56) References Cited

U.S. PATENT DOCUMENTS

| 2016/0224153 | A1* | 8/2016 | Bae ........................ G06F 3/0443 |
| 2020/0117334 | A1* | 4/2020 | Li ............................ G06F 3/041 |
| 2020/0328363 | A1* | 10/2020 | Guo .................... H01L 51/0097 |
| 2021/0333965 | A1* | 10/2021 | He ......................... G06F 3/0443 |

* cited by examiner

*Primary Examiner* — Robin J Mishler
(74) *Attorney, Agent, or Firm* — Gunther Evanina; Butzel Long

(57) ABSTRACT

A touch control substrate, a preparation method thereof, a touch control module, and a display device are provided. The touch control substrate comprises: a substrate, a conductive functional layer, and a second protection medium. The conductive functional layer is arranged on one side of the substrate, and comprises patterned nano conductive structure, first protection medium, and frame lead structure. The conductive functional layer is protected by providing a two-layer protection medium structure, wherein the first protection medium fixes the structural position of the nano conductive layer and protects the partial structure of the conductive functional layer, and the second protection medium at least completely covers the nano conductive layer located in the conductive functional area; and at the same time, the touch control substrate directly disposes the frame lead layer in the peripheral area of the nano conductive layer, making the frame lead directly contacting the nano conductive layer.

20 Claims, 7 Drawing Sheets

TOUCH CONTROL SUBSTRATE AND PREPARATION METHOD THEREOF, TOUCH CONTROL MODULE AND DISPLAY DEVICE

CROSS-REFERENCE TO RELATED APPLICATIONS

The present application claims priority to Chinese Patent Application No. 202111382106.9, filed on Nov. 22, 2021, entitled "Touch Control Substrate and Preparation Method thereof, Touch Control Module and Display Device," the contents of which are incorporated herein by reference in its entirety.

TECHNICAL FIELD

The present application relates to the field of touch control technology, and in particular, to a touch control substrate and a preparation method thereof, a touch control module and a display device.

BACKGROUND ART

Currently, touch panels are widely used in electronic devices, such as mobile phones, in-vehicle devices, and home appliances. The core component of the touch control panel is a sensor electrode layer which is independent and continuous in two directions, and determines the touch position by calculating the strength of the coupling current generated at the receiving terminal in two directions perpendicular to each other, with the coupling current being generated when the human body is in contact with the screen. Therefore, the protection on the material and structure of the touch control electrode layer has become an important factor in determining the service life and sensitivity of the touch panel.

There is a touch control panel in which one protection layer is provided on the side of the touch control electrode layer away from the substrate. Considering that the protection layer in partial area needs to be removed when the frame leads are prepared subsequently, the thickness of the protection layer should not be too large, resulting in that the protection effect on the touch control electrode layer is limited, and water vapor and dust can easily enter the touch control electrode layer. At the same time, when the frame lead of such touch control panel is connected to the touch control electrode, the protection layer in that area needs to be removed by an etching process, thereby increasing the process steps and cost.

SUMMARY

The purpose of the present application is to provide a touch control substrate, a preparation method thereof, a touch control module and a display device, so as to solve the problem that the existing touch control panel cannot effectively protect the electrode layer and the preparation process is complicated.

In the first aspect, an embodiment of the present application provides a touch control substrate, comprising: a substrate, a conductive functional layer, and a second protection medium. The substrate comprises a conductive functional area and a frame lead area; the conductive functional layer is placed on one side of the substrate; the conductive functional layer comprises a nano conductive structure, a first protection medium and a frame lead structure which are patterned; the first protection medium and the nano conductive structure are arranged in a same layer, and the nano conductive structure is partially embedded in the first protection medium; the frame lead structure is arranged in an area of the nano conductive structure corresponding to the frame lead area and is in direct electrical contact with the nano conductive structure; and an area of the conductive functional layer corresponding to the conductive functional area comprises a first patterned area; and the second protection medium covers at least the surface of the nano conductive structure located in the conductive functional area, and fills the space of the first patterned area.

Optionally, the area of the conductive functional layer corresponding to the frame lead area comprises a second patterned area; and the second protection medium covers the surface of the frame lead structure and fills the space of the second patterned area.

Optionally, the nano conductive layer comprises a nano conductive material, and a part of the nano conductive material is embedded in the first protection medium.

Optionally, the nano conductive material comprises: nano silver wires, nano scale metal grids, or nano scale transparent electrode particles.

Optionally, the size of the nano conductive structure along a direction perpendicular to the substrate is larger than that of the first protection medium along a direction perpendicular to the substrate, and a plane on which a side of the nano conductive layer away from the substrate is located and a plane on which a side of the first protection medium away from the substrate is located have a predetermined spacing therebetween, and the predetermined spacing is 10 nanometers to 300 nanometers.

Optionally, the first protection medium and the second protection medium both comprise transparent water-resistant materials which are neutral or have low acid content.

Optionally, the material of the first protection medium and/or the second protection medium comprises acrylate or silicon dioxide.

Optionally, the material of the frame lead structure comprises nano silver paste, copper or graphene; and/or the size of the frame lead structure along a direction perpendicular to the substrate is 0.1 µm to 2 µm.

In the second aspect, the embodiments of the present application also provide a touch control module, wherein the touch control module comprises: a cover plate and a touch control substrate according to the first aspect, wherein the cover plate is arranged on one side of the second protection medium included in the touch control substrate, which side is away from the substrate, and the cover plate is installed as aligned with the touch control substrate, through a first transparent optical adhesive layer; or the touch control module comprises: a cover plate and two touch control substrates according to the first aspect, wherein the two touch control substrates are arranged as stacked, and the cover plate is arranged one side of the second protection medium of the touch control substrate close to an outer layer, which side is away from the substrate of the touch control substrate; the cover plate is installed as aligned with the touch control substrate close to the outer layer, through a second transparent optical adhesive layer; and a substrate included in the touch control substrate close to the outer layer is installed as aligned with the touch control substrate close to an inner layer, through a third transparent optical adhesive layer.

In the third aspect, the embodiments of the present application also provide a display device, comprising: a display module and the touch control module according to the second aspect, wherein the touch control module and the display module are arranged as aligned with each other.

In the fourth aspect, the embodiments of the present application also provide a method for preparing a touch control substrate, comprising steps of: providing a substrate, wherein the substrate is defined to have a conductive functional area and a frame lead area; preparing a nano conductive layer on one side of the substrate; coating a first protection coating on one side of the nano conductive layer away from the substrate, wherein the first protection coating permeates to inside of the nano conductive layer and forms a first protection medium after curing; preparing a frame lead layer on an area on one side of the nano conductive layer away from the substrate and corresponding to the frame lead area; patterning the nano conductive layer, the first protection medium and the frame lead layer to form a conductive functional layer comprising the patterned nano conductive structure, the patterned first protection medium and the patterned frame lead structure, wherein an area of the conductive functional layer corresponding to the conductive functional area comprises a first patterned area; and preparing a second protection medium on one side of the conductive functional layer away from the substrate, wherein the second protection medium at least covers the surface of the nano conductive structure located in the conductive functional area and fills the space of the first patterned area.

Optionally, the step of preparing a nano conductive layer on one side of the substrate comprises: forming one layer of nano material solution coating on one side of the substrate, wherein the nano material solution coating comprises nano conductive materials and a matrix solvent; and curing the nano material solution coating so as to form the nano conductive layer.

The embodiments of the present application have at least the following technical effects.

The touch control substrate provided by these embodiments protects the conductive functional layer by providing a two-layer protection medium structure, wherein the first protection medium fixes the structural position of the nano conductive layer and protects the partial structure of the conductive functional layer, and the second protection medium at least completely covers the surface of the nano conductive layer located in the conductive functional area, which can effectively prevent moisture, dust, etc. from entering the nano conductive layer, and improve the sensitivity and service life of the touch screen; and at the same time, the touch control substrate directly disposes the frame lead layer on the peripheral area of the nano conductive layer, such that the frame lead directly contacts the nano conductive layer to realize the electrical connection, which saves steps and cost of the preparation process.

BRIEF DESCRIPTION OF DRAWINGS

In order to more clearly illustrate the embodiments of the present application or the technical solutions in the prior art, the drawings that need to be used in the embodiments or the description of the prior art will be briefly introduced as follows. Obviously, the drawings in the following description show some embodiments of the present application. For those skilled in the art, other drawings can be obtained based on these drawings without creative work.

DETAILED DESCRIPTION OF EMBODIMENTS

The technical solutions of the present application will be clearly and completely described below in conjunction with embodiments. Obviously, the described embodiments are part of the embodiments of the present application, rather than all of them. Based on the embodiments in the present application, all other embodiments, which are obtained by a person skilled in the art without creative work, shall fall within the protection scope of the present application.

Those skilled in the art can understand that, unless otherwise defined, all terms (comprising technical terms and scientific terms) used herein have the same meanings as those commonly understood by those skilled in the art to which the present application belongs. It should also be understood that terms, such as those defined in general dictionaries, should be understood to have a meaning consistent with the meaning in the context in the prior art, and unless specifically defined as here, they will not be idealized or overly explained to have the formal meaning.

Those skilled in the art can understand that, unless specifically stated otherwise, the singular forms "a", "an", "said" and "the" used herein may also comprise plural forms. It should be further understood that the term "comprise" used in the specification of the present application refers to the presence of the described features, integers, steps, operations, elements and/or components, but does not exclude the presence or addition of one or more other features, integers, steps, operations, elements, components, and/or groups of them. The term "and/or" as used herein comprises all or any unit and all combinations of one or more of the associated listed items.

Figure 1:
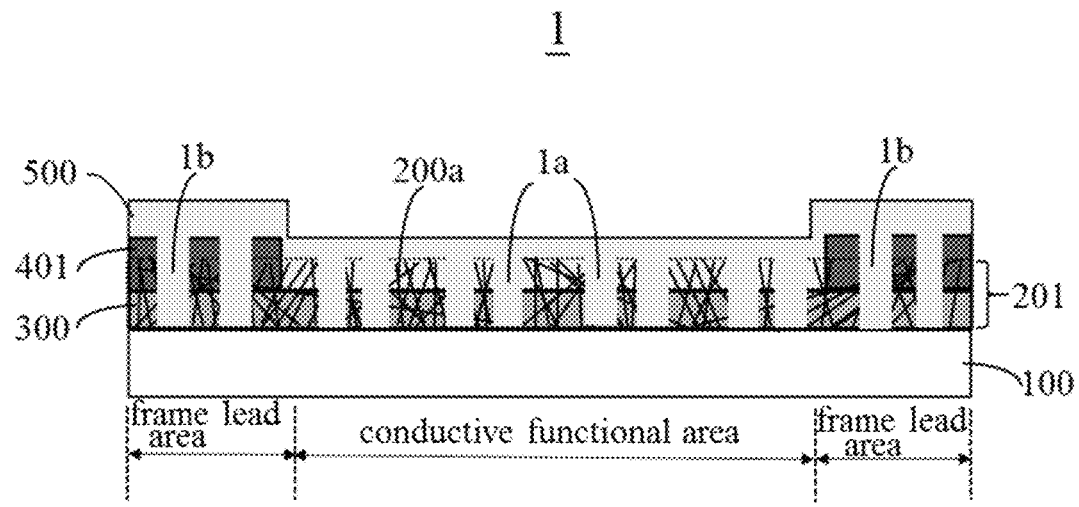
FIG. 1 is a schematic internal structural diagram of a touch control substrate provided by an embodiment of the present application.

As shown in FIG. 1, the touch control substrate 1 provided by the embodiment of the present application comprises: a substrate 100, a conductive functional layer (not shown in the figures), and a second protection medium 500. The conductive functional layer is disposed on a side of the substrate 100, and the second protection medium 500 covers the surface of the conductive functional layer, wherein the substrate 100 is divided into a conductive functional area and a frame lead area, according to different areas, and the frame lead area is generally located at the periphery of the conductive functional area. The material of the substrate 100, such as, PET, CPI, etc., can be selected such that it is a flexible substrate, or the material, such as, glass, plastic, etc., can be selected, such that it is a rigid substrate. The thickness of the substrate 100 is substantially between 0.1 mm and 1 mm.

Specifically, the conductive functional layer comprises a nano conductive structure 201, a first protection medium 300, and a frame lead layer 400 which are patterned. The nano conductive structure 201 is a metal conductive structure after the touch control substrate 1 is patterned. The first protection medium 300 and the nano conductive structure 201 are arranged in the same layer. The nano conductive structure 201 is partially embedded in the first protection medium 300, that is, the nano conductive structure 201 is not completely covered by the first protection medium 300, but a part of it extends out of the first protection medium 300. Due to the gaps existing in the nano conductive structure 201, the first protection medium 300 completely permeates to inside of the nano conductive structure 201, thereby achieving the effects of fixing and protecting the nano conductive material 200*a* in the nano conductive structure 201.

It is understandable that since the touch control substrate 1 is generally used in conjunction with a display module, in order not to affect the display effect, the nano conductive structure 201 is a patterned transparent electrode structure made of transparent nano level materials, that is, a nano conductive structure 201 is prepared by performing a patterning process on a transparent nano conductive layer. In addition, the nano conductive layer and the first protection medium 300 in each embodiment of the present application can be regarded as an approximate planar film structure.

Further, the frame lead structure 401 is disposed in the peripheral area of the nano conductive structure 201. Since the first protection medium 300 permeates to inside of the structure of the nano conductive structure 201, the frame lead structure 401 is made to realize the direct electrical contact with a part of the nano conductive structure 201 which is exposed to the first protection medium 300, so that steps and costs of the process can be saved. Herein, a part of the frame lead structure 401 is embedded in the nano conductive structure 201.

In some optional embodiments, the frame lead structure 401 may also be in contact with the first protection medium 300.

As for the conductive functional layer in this embodiment, in order for forming the required electrode pattern (see FIG. 14), the nano conductive layer 200 and the frame lead layer 400 in the partial area can be removed by laser or a patterning process, thereby forming patterned openings and at the same time, forming a patterned nano conductive structure 201 and a patterned frame lead structure 401. The patterned openings enable the conductive functional layer to form a touch control electrode structure with patterns. In this embodiment, the conductive functional layer comprises a first patterned area 1*a* corresponding to the conductive functional area and a second patterned area 1*b* corresponding to the frame lead area. The patterned openings are distributed in the first patterned area 1*a* and the second patterned area 1*b*.

It should be noted that, depending on the different depths of the patterned openings, the first protection medium 300 can be of a complete film structure or a patterned first protection structure, which is not specifically limited in this embodiment, and only a complete first protection medium 300 is used as the example to make the explanation.

In this embodiment, in order to improve the protection on the nano conductive structure 201, on the basis of forming the first protection medium 300, the second protection medium 500 at least covers the surface of the conductive functional area of the conductive functional layer. Specifically, in addition to covering the surface of the nano conductive structure 201, the second protection medium 500 also fills the space of the first patterned area 1*a*, so as to strengthen the protection on the nano conductive structure 201.

The touch control substrate 1 provided in this embodiment protects the conductive functional layer by providing a two-layer protection medium structure, wherein the first protection medium 300 fixes the structural position of the nano conductive structure 201 and protects the partial structure of the conductive functional layer, and the second protection medium 500 completely covers the surface of the nano conductive structure 201 corresponding to the conductive functional area, which can effectively prevent water vapor, dust, etc. from entering the nano conductive structure 201, improving the sensitivity and service life of the touch screen; and at the same time, the touch control substrate 1 makes the frame lead directly contact the nano conductive structure 201 to realize the electrical connection, through directly disposing the frame lead structure 401 at the peripheral area of the nano conductive structure 201, which saves steps and costs of the preparation process.

In an optional embodiment, continuing to refer to FIG. 1, in this embodiment, the area of the conductive functional layer corresponding to the frame lead area comprises a second patterned area 1*b*, and the second patterned area 1*b* corresponds to the patterned opening of the frame lead area.

In order to further protect the touch control electrodes, in addition to covering the surface of the nano conductive structure in the conductive functional area, the second protection medium also covers the surface of the frame lead structure in the frame lead area, and at the same time fills the space of the second patterned area 1*b*, which further improves the protection effect of the second protection medium on the conductive functional layer.

Figure 2:
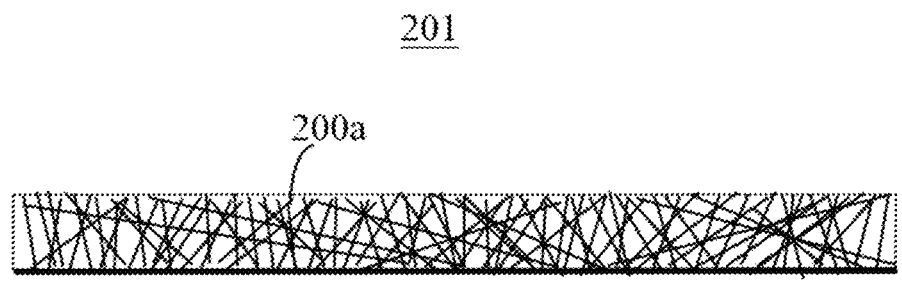
FIG. 2 is a schematic structural diagram of a nano conductive structure of a touch control substrate provided by an embodiment of the present application.
Figure 3:
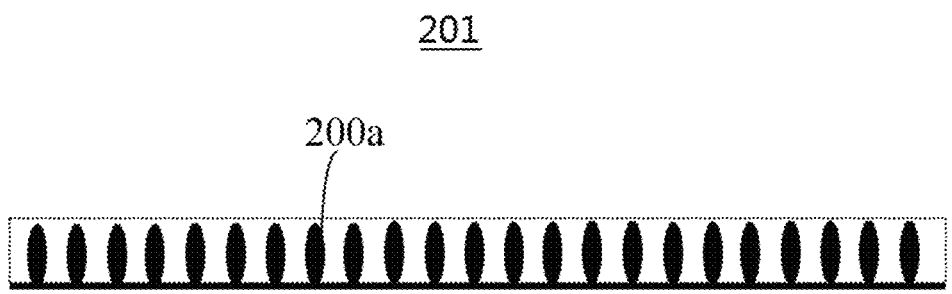
FIG. 3 is a schematic structural diagram of a nano conductive structure of another touch control substrate provided by an embodiment of the present application.

In an optional embodiment, referring to FIGS. 2 and 3 (the nano conductive structures 201 shown in FIGS. 2 and 3 do not show the patterned opening), the nano conductive structure 201 provided in this embodiment comprises several nano conductive materials 200*a*. The several nano conductive materials 200*a* are presented in different distribution states according to the preparation materials and processes. In this embodiment, the matrix material of the nano conductive solution can be regarded as being completely volatilized after curing (for example: ethanol or isopropanol), and the several remaining nano conductive materials 200a overlap each other (are lap jointed with each other) or are arranged on the substrate 100 at intervals. The protection medium 300 fixes and protects the part of the nano conductive material 200 close to the substrate 100.

Specifically, the nano conductive material 200a is a conductive material used to prepare the nano conductive structure 201, a part of the nano conductive material 200a is embedded in the first protection medium 300, and the position of the nano conductive material 200a is fixed by the first protection medium 300 and at the same time, to a certain extent, it can also protect the nano conductive material 200a. Another part of the nano conductive material 200a extends out of the first protection medium 300 (specifically, on the side of the first protection medium 300 away from the substrate 100). This part of the nano conductive material 200a can directly contact the frame lead structure 401, so as to realize the electrical connection between the nano conductive structure 201 and the frame lead structure 401.

Exemplarily, the nano conductive material 200a illustrated in FIG. 2 refers to a nano silver wire, and the nano conductive material 200a illustrated in FIG. 3 refers to a nano scale transparent electrode particle.

Figure 4:
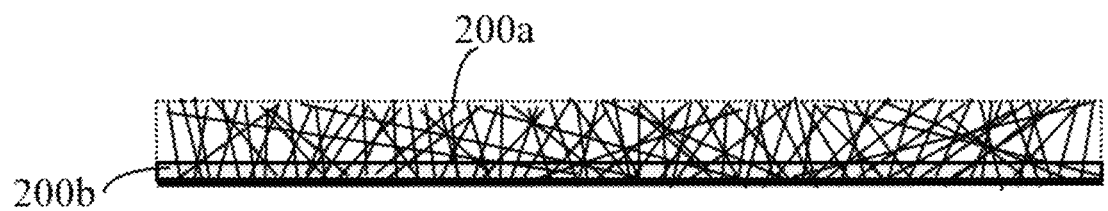
FIG. 4 is a schematic structural diagram of a nano conductive structure of another touch control substrate provided by an embodiment of the present application.

In another optional embodiment, as shown in FIG. 4 (the nano conductive structure 201 shown in FIG. 4 does not show the patterned opening), the nano conductive structure 201 comprises: a nano conductive material 200a and a patterned matrix layer 200b, and that is, partial matrix layer material remains in the nano conductive layer used to prepare the nano conductive structure 201 (specifically, determined by the material of the matrix layer 200b), and the patterning of the matrix layer 200b is obtained after preparing the patterned openings.

Specifically, the matrix layer 200b, which is formed by a cured nano conductive film layer, is disposed on one side of the substrate 100, the first protection medium 300 is located on the side of the matrix layer 200b away from the substrate 100, and a part of the nano conductive material 200a is embedded in both the first protection medium 300 and the matrix layer 200b. The matrix layer 200b is closer to the substrate 100 than the first protection medium 300. The matrix layer 200b is generally formed before the first protection medium 300.

It should be noted that the nano conductive layer used to prepare the nano conductive structure 201 is obtained by curing the nano material solution coating. The nano material solution coating comprises the nano conductive material 200a and the matrix solvent, and the part of the matrix solvent, that is not completely volatilized after the curing, forms the matrix layer 200b.

In some embodiments, the nano conductive material 200a in the embodiment of the present application comprises: nano silver wires, nano scale metal grids, or nano scale transparent electrode (ITO) particles. The nano conductive structure 201 composed of the above-mentioned nano conductive material 200a has certain gaps, as long as it is ensured that the coating used to form the first protection medium 300 can permeate to inside of the nano conductive layer used to prepare the nano conductive structure 201.

Optionally, the nano conductive material 200a adopts nano silver wires. The ink solid content of the nano silver wires used to prepare the nano conductive structure 201 is 0.1%-2%, the diameter of the nano silver wires is 15-35 nanometers, and the length of the nano silver wires is 15 μm to 25 μm, and the viscosity thereof is 5 cps to 20 cps (cps represents the viscosity unit, in centipopsis-second).

Figure 5:
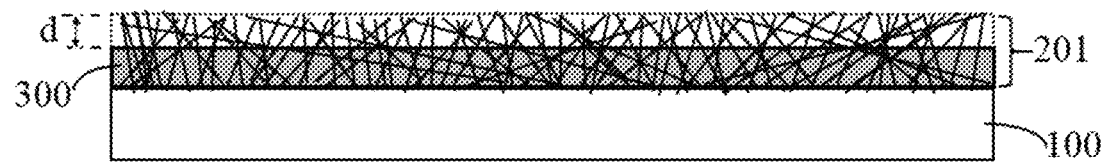
FIG. 5 is a schematic structural diagram of a nano conductive structure and a first protection medium of a touch control substrate provided by an embodiment of the present application.

In some embodiments, as shown in FIG. 5 (the nano conductive structure 201 shown in FIG. 5 does not show the patterned opening), in order to improve the fixing and protection effects of the first protection medium 300 on the nano conductive structure 201, in this embodiment, the thickness difference between the first protection medium 300 and the nano conductive structure 201 is defined.

Specifically, the thickness (size) of the nano conductive structure 201 in the direction perpendicular to the substrate 100 (equivalent to the thickness of the nano conductive structure 201) is greater than that of the first protection medium 300 in the direction perpendicular to the substrate 100 (equivalent to the first protection medium 300), and the plane on which the side of the nano conductive structure 201 away from the substrate 100 is located and the plane on which the side of the first protection medium 300 away from the substrate 100 is located have a predetermined spacing therebetween.

Optionally, in this embodiment, the thickness of the nano conductive structure 201 is 30 nanometers to 500 nanometers, and the thickness of the first protection medium 300 is 20 nanometers to 200 nanometers. Regardless of the thickness of the matrix layer 200b, the predetermined spacing d (that is, the thickness of the part of the nano conductive layer 200 exposed to the first protection medium 300) is set as 10 nanometers to 300 nanometers. Herein, each of the thicknesses in this embodiment refers to the size along the direction perpendicular to the plane of the substrate 100.

It should be noted that, for ease of understanding, in this embodiment, the nano conductive structure 201 and the first protection medium 300 are both regarded as an ideal film structure, that is, the thicknesses of both the nano conductive structure 201 and the first protection medium 300 are uniform. That is, one side of the nano conductive structure 201 and the first protection medium 300 away from the substrate 100 can both be regarded as being of a planar structure.

In this embodiment, by controlling the predetermined spacing between the plane on which the side of the nano conductive structure 201 away from the substrate 100 is located and the plane on which the side of the first protection medium 300 away from the substrate 100 is located, the fixing and protection of the first protection medium 300 to the nano conductive material 200a can be improved, and at the same time, it can also ensure the stability of the connection between the nano conductive material 200a and the frame lead structure 401.

In some embodiments, in order to enhance the protection effect of the nano conductive material 200a, both the first protection medium 300 and the second protection medium 500 use the transparent materials that are neutral or have a low acid content, and have good water resistance, wherein materials that are neutral or have low acid content are mainly used to prevent corrosion of the nano conductive material 200a, the transparent materials are used for ensuring the display effect after the touch control substrate 1 is assembled with the display module, and the materials having the good water resistance are used for preventing water vapor from entering the nano conductive layer 200, improving the protection effect on the touch control electrode.

Optionally, the material of the first protection medium 300 comprises acrylate or silicon dioxide, and the material of the second protection medium 500 also comprises acrylate or silicon dioxide.

Optionally, the material of the frame lead structure 401 comprises nano silver paste, copper or graphene. These materials can be printed by inkjet printing, which is convenient and quick.

Optionally, the thickness of the frame lead structure 401 (the size along the direction perpendicular to the substrate 100) is 0.1 μm to 2 μm, such that the process cost is controlled as much as possible under the premise of ensuring a certain electrical connection strength.

Figure 6:
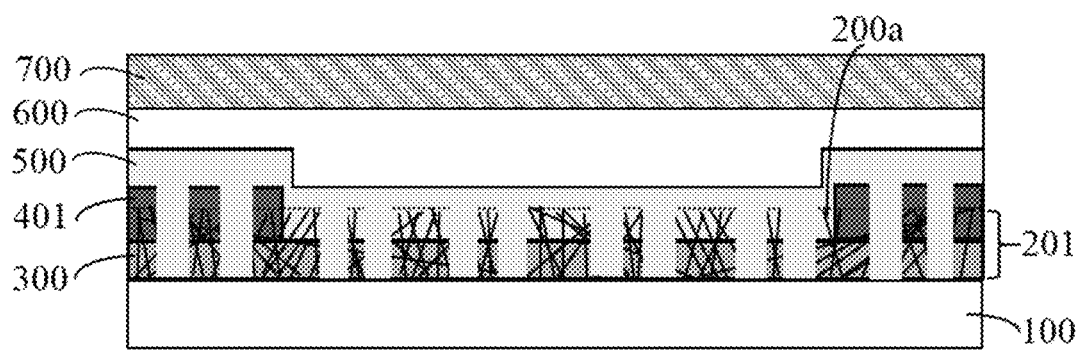
FIG. 6 is a schematic internal structural diagram of a touch control module provided by an embodiment of the present application.

Based on the same inventive concept, as shown in FIG. 6, an embodiment of the present application also provides a single-layer touch control module. The touch control module comprises: a cover plate 700 and a touch control substrate 1 in the foregoing embodiments. The cover plate 700 is disposed on the side of the second protection medium 500 of the touch control substrate 1 away from the substrate 100 of the touch control substrate 1.

Specifically, the cover plate 700 is installed as aligned with the second protection medium 500 through the first transparent optical adhesive layer 600. The material of the cover plate 700 comprises glass, plastic or ceramic, which can prevent the damage to the touch control substrate 1 caused by the external force impact, in the case of not affecting the display effect, and has a protection effect to a certain extent.

Figure 7:
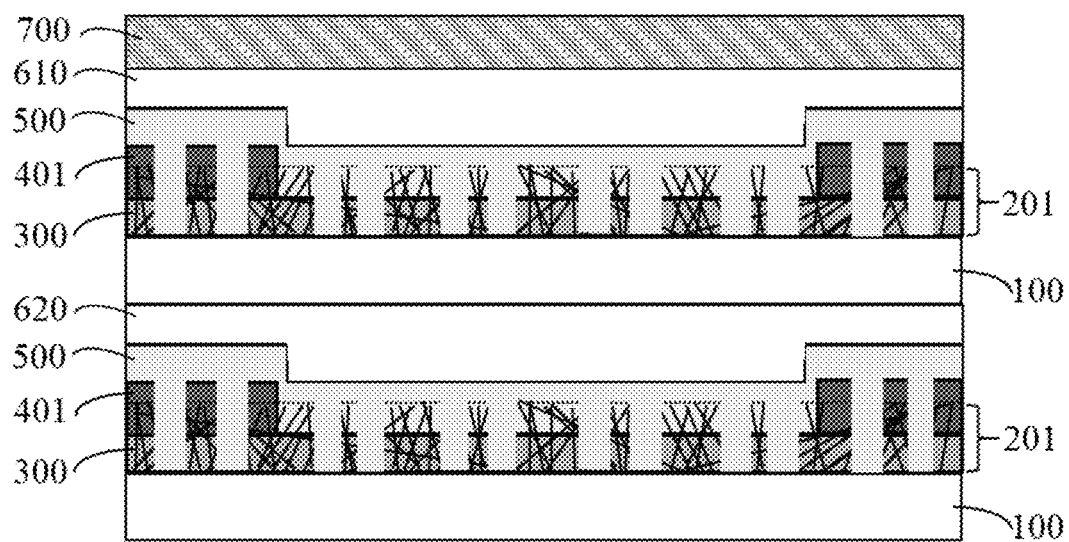
FIG. 7 is a schematic internal structural diagram of another touch control module provided by an embodiment of the present application.

In an optional embodiment, as shown in FIG. 7, an embodiment of the present application also provides a double-layer touch control module, and the touch control module comprises: a cover plate 700 and two touch control substrates 1 as in the previous embodiment. The two touch control substrates 1, which are of the same structure, are stacked. The substrate 100 of the touch control substrate 1 close to the outer layer is adhered to the second protection medium 500 of the touch control substrate 1 close to the inner layer through the third transparent optical adhesive layer 620. In addition, the frame lead layers 400 included in the two touch control substrates 1 are electrically connected with each other through external circuits, so that a capacitive model structure is formed between the nano conductive layers 200 of the two touch control substrates 1.

Further, the cover plate 700 is arranged on the side of the second protection medium 500 of the touch control substrate 1 close to the outer layer, which side is away from the substrate 100 of the touch control substrate 1. The arrangement mode of the cover plate 700 is coincident with that of the single-layer touch control module. The cover plate 700 in this embodiment is installed as aligned with the touch control substrate 1 close to the outer layer through two transparent optical adhesive layers 610.

The touch control module provided in this embodiment comprises the touch control substrate 1 in the previous embodiment. In the touch control substrate 1, the conductive functional layer is protected by providing a two-layer protection medium structure, wherein the first protection medium 300 fixes the structural position of the nano conductive layer 200 and protects the partial structure of the conductive functional layer. The second protection medium 500 completely covers the surface of the nano conductive layer 200, which can effectively prevent water vapor and dust, etc. from entering the nano conductive layer 200 and improve the sensitivity and service life of the touch screen. At the same time, the touch control substrate 1, through directly disposing the frame lead layer 400 in the peripheral area of the nano conductive layer 200, makes the frame lead directly contact the nano conductive layer 200 to realize the electrical connection, which saves steps and costs of the preparation process.

Based on the same inventive concept, an embodiment of the present application also provides a display device, comprising: a display module and the touch control module in the foregoing embodiment. The touch control module and the display module are provided as aligned with each other, so as to form a complete display device with the touch control function.

Specifically, as for a double-layer touch control module, in the touch control module, the substrate 100 of the touch control substrate 1 at the bottom is installed as aligned with the packaging layer of the display module or the cover plate 700. As for a single-layer touch control module, the substrate 100 of the touch control substrate 1 is installed as aligned with the packaging layer of the display module or the cover plate 700.

Optionally, the display device provided in this embodiment may be a touch display device, such as a smart phone or a tablet computer.

The display device in this embodiment comprises the touch control module in the foregoing embodiment. The touch control substrate 1 included in the touch control module realizes the protection on the conductive functional layer by providing a two-layer protection medium structure, wherein the first protection medium 300 is used to fix the structural position of the nano conductive structure 201, and at the same time, it can also fulfill the effect of protecting partial structure of the conductive functional layer. The second protection medium 500 completely covers the surface of the nano conductive structure 201 in the conductive functional area, which can effectively prevent water vapor, dust and the like from entering the nano conductive layer 200, improving the sensitivity and service life of the touch screen. At the same time, the touch control substrate 1, through directly disposing the frame lead layer 400 in the peripheral area of the nano conductive layer 200, makes the frame lead directly contact the nano conductive layer 200 to realize the electrical connection, which saves steps and costs of the preparation process.

Figure 8:
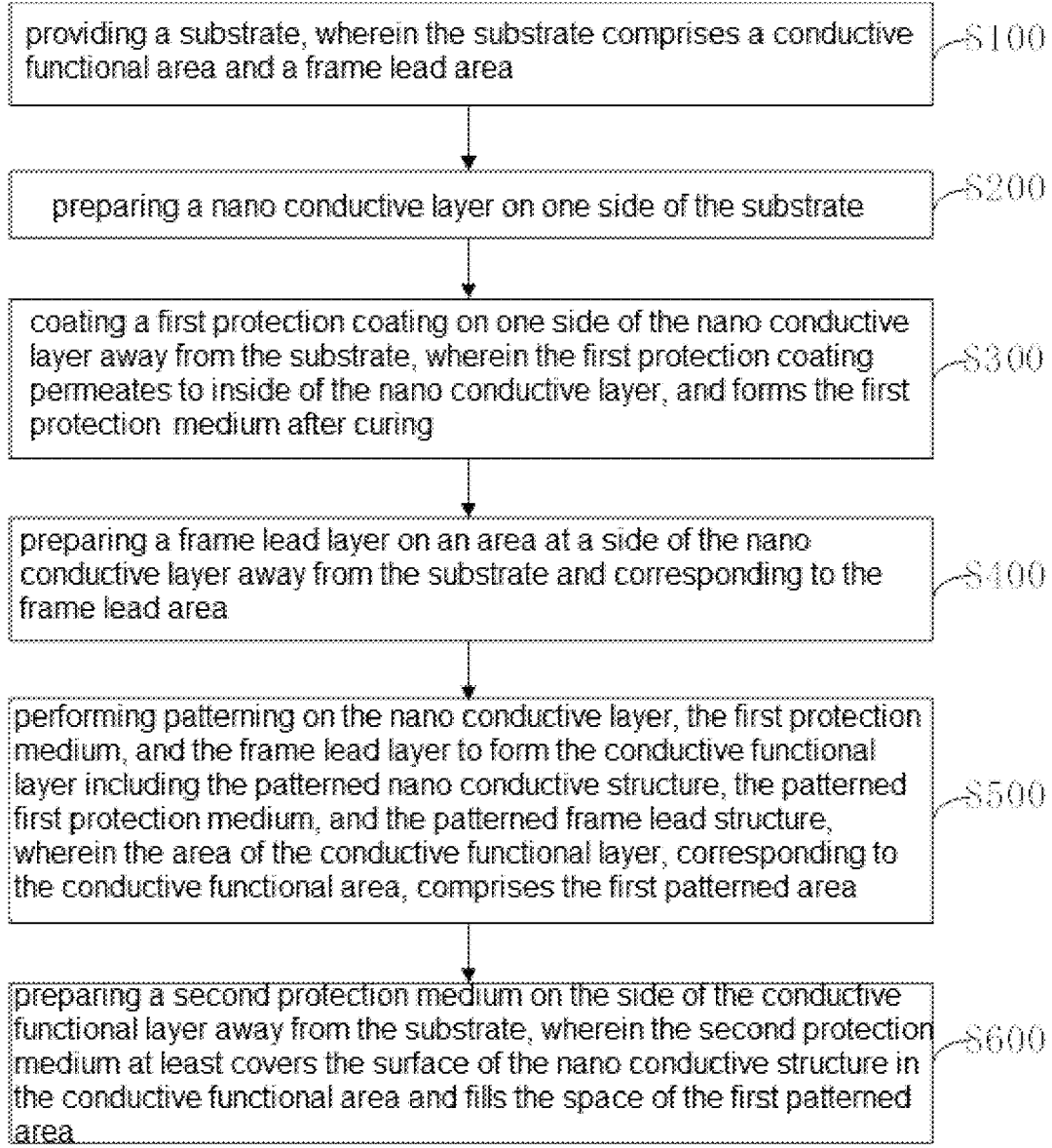
FIG. 8 is a flowchart of a method for preparing a touch control substrate provided by an embodiment of the present application.

Based on the same inventive concept, as shown in FIG. 8, an embodiment of the present application also provides a method for preparing a touch control substrate 1, comprising the following steps:

S100, providing a substrate 100, wherein the substrate 100 comprises a conductive functional area and a frame lead area.

Optionally, the substrate 100 is defined to have a conductive functional area and a frame lead area according to different areas. The conductive functional area is used to prepare a touch control electrode structure of a touch control substrate, and the frame lead area is located in a peripheral area of the conductive functional area.

Figure 9:
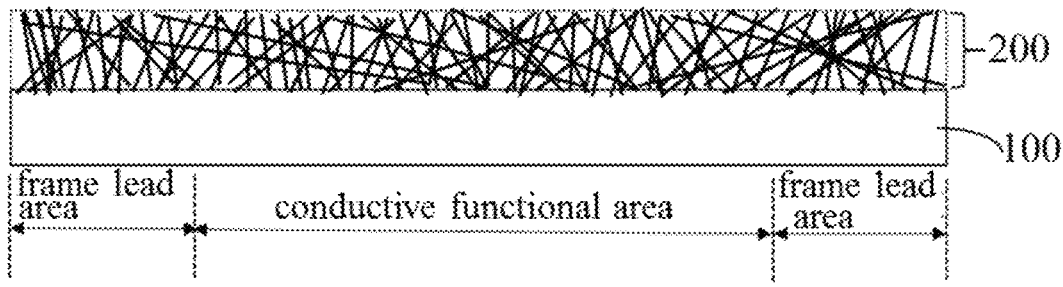
FIG. 9 is a process structural diagram corresponding to Step S200 in a method for preparing a touch control substrate provided by an embodiment of the present application.

S200, preparing a nano conductive layer 200 on one side of the substrate 100, referring to FIG. 9.

Figure 10:
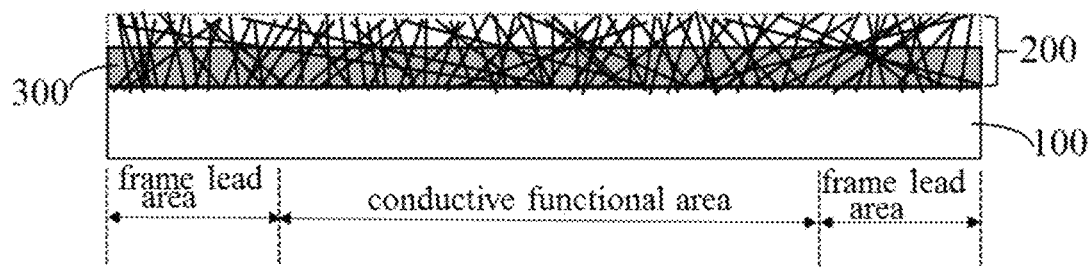
FIG. 10 is a process structural diagram corresponding to Step S300 in a method for preparing a touch control substrate provided by an embodiment of the present application.

S300, coating a first protection coating on one side of the nano conductive layer 200 away from the substrate 100, wherein the first protection coating permeates to inside of the nano conductive layer 200, and forms the first protection medium 300 after curing, referring to FIG. 10.

Figure 11:
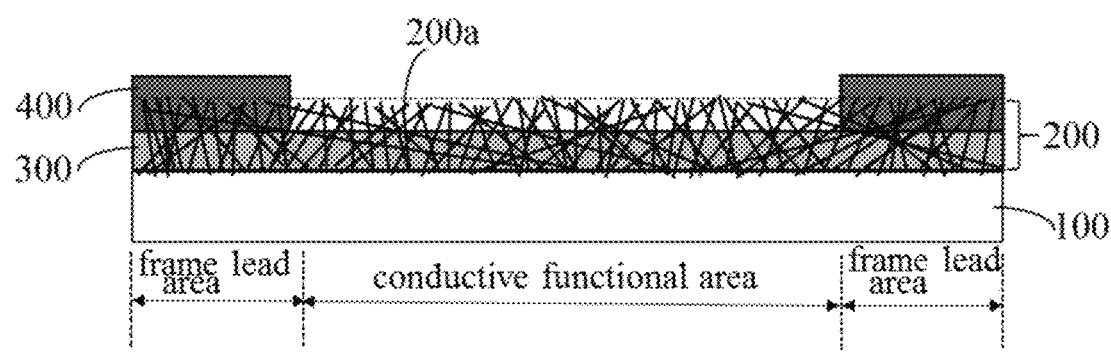
FIG. 11 is a process structural diagram corresponding to Step S400 in a method for preparing a touch control substrate provided by an embodiment of the present application.

S400, preparing a frame lead layer 400 on an area at a side of the nano conductive layer 200 away from the substrate 100 and corresponding to the frame lead area, referring to FIG. 11.

Figure 12:
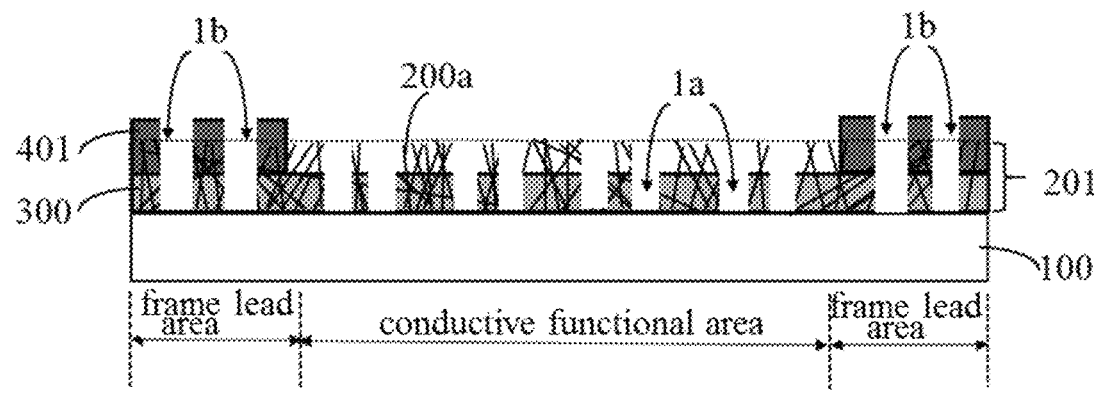
FIG. 12 is a process structural diagram corresponding to Step S500 in a method for preparing a touch control substrate provided by an embodiment of the present application.
Figure 13:
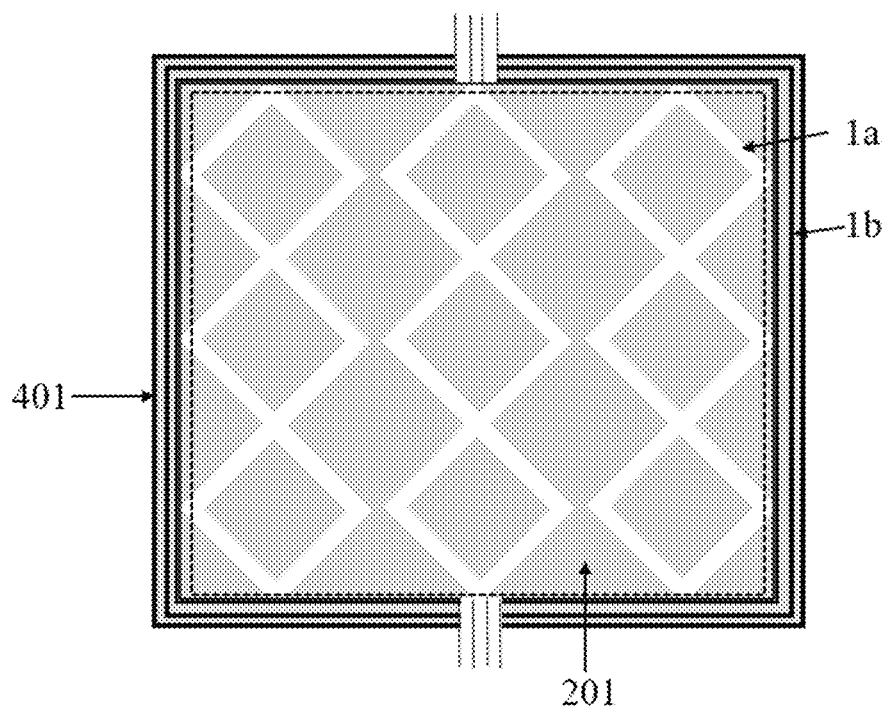
FIG. 13 is a top view of a process structural diagram corresponding to Step S500 in a method for preparing a touch control substrate provided by an embodiment of the present application.

S500, performing patterning on the nano conductive layer 200, the first protection medium 300, and the frame lead layer 400 to form the conductive functional layer including the patterned nano conductive structure 201, the patterned first protection medium 300, and the patterned frame lead structure 401, wherein the area of the conductive functional layer, corresponding to the conductive functional area, comprises the first patterned area 1a, referring to FIGS. 12 and 13.

Optionally, the area of the conductive functional layer, corresponding to the frame lead area, comprises the second patterned area 1b.

S600, preparing a second protection medium 500 on the side of the conductive functional layer away from the substrate 100, wherein the second protection medium 500 at least covers the surface of the nano conductive structure 201 in the conductive functional area and fills the space of the first patterned area 1a, continuing to refer to FIG. 1.

In the method for preparing the touch control substrate 1 provided in this embodiment, the gap of the nano conductive layer 200 is used to allow the first protection medium 300 to be formed therein, for fixing the structural position of the nano conductive layer 200, and at the same time, being capable of protecting the partial structure of the nano conductive layer 200. Through forming the second protection medium 500 to completely cover the surface of the nano conductive layer 200, it can effectively prevent water vapor, dust, etc. from entering the nano conductive layer 200, improving the sensitivity and service life of the touch screen. The touch control substrate 1, through disposing the frame lead layer 400 in the peripheral area of the nano conductive layer 200, makes the frame lead structure 401 directly contact the nano conductive layer 200 to realize the electrical connection, which saves steps and costs of the preparation process.

Figure 14:
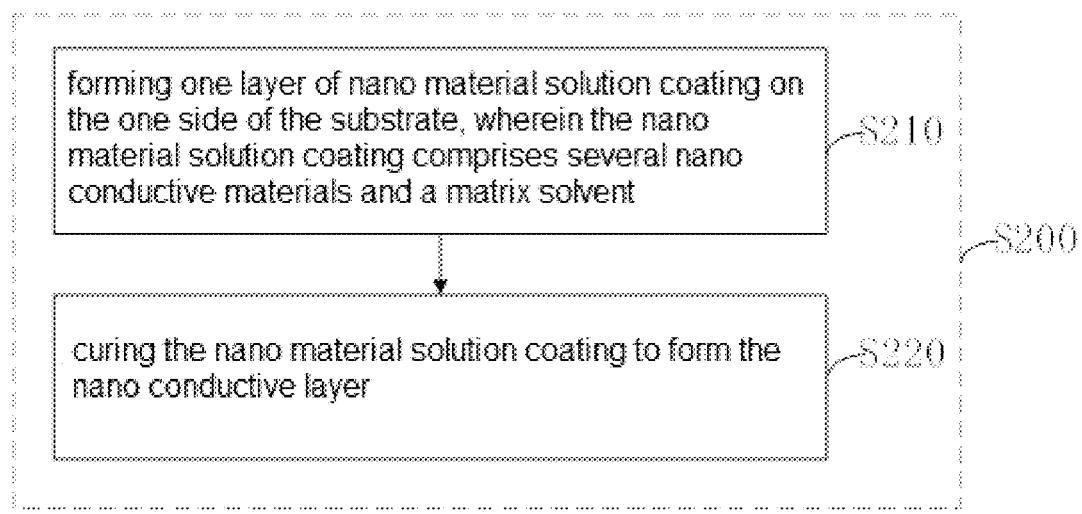
FIG. 14 is a specific flowchart of Step S200 in a method for preparing a touch control substrate prepared by an embodiment of the present application.

Optionally, as shown in FIG. 14, in the foregoing step S200, the step of preparing a nano conductive layer 200 on one side of the substrate 100 comprises:

S210, forming one layer of nano material solution coating on the one side of the substrate 100, wherein the nano material solution coating comprises several nano conductive materials 200a and a matrix solvent.

Optionally, the material of the nano material solution coating is a mixture of a matrix solvent and several nano conductive materials 200a. As an example in which the nano conductive material 200a is the nano silver wire, the matrix solvent may comprise ethanol or isopropanol. The solid content of the nano silver wire coating is 0.1%-2%, and the viscosity is 5 cps-20 cps.

S220, curing the nano material solution coating to form the nano conductive layer 200.

Specifically, depending on the different composition of the matrix solvent, the degree of volatilization during the curing of the nano material solution coating is also different. For example: when the matrix solvent only comprises ethanol or isopropanol, substantially no matrix solvent exists in the nano conductive layer 200 obtained after curing, and only the nano conductive material 200a is left; and when besides ethanol or isopropanol, the matrix solution also comprises surfactant, dispersant, stabilizer or binder used to increase the overall performance of the nano material solution coating, along with the nano material solution coating being cured, the ethanol or isopropanol will volatilize, and the surfactant, dispersant, stabilizer or binder will remain on the substrate 100 to form the matrix layer 200b, and the first protection medium 300 prepared later covers the matrix layer 200b.

It should be noted that the coating method of each film layer in the embodiments of the present application comprises, but is not limited to, slit coating, screen printing or inkjet printing.

Those skilled in the art can understand that the steps, measures, and solutions in various operations, methods, and process that have been discussed in the present application can be alternated, changed, combined, or deleted. Further, other steps, measures, and solutions in the various operations, methods, and process that have been discussed in the present application can also be alternated, changed, rearranged, decomposed, combined, or deleted. Further, the steps, measures, and solutions in the various operations, methods, and process disclosed in the present application in the prior art can also be alternated, changed, rearranged, decomposed, combined, or deleted.

In the description of the present application, it should be understood that the orientation or positional relationship indicated by the terms, such as, "center", "upper", "lower", "front", "rear", "left", "right", "vertical", "horizontal", "top", "bottom", "inner", "outer", etc., is based on the orientation or positional relationship shown in the drawings, which is only for the convenience of describing the present application and simplifying the description, rather than indicating or implying that the mentioned device or element must be at a specific orientation, or constructed and operated in a specific orientation, and therefore it cannot be understood as a limitation to the present application.

The terms, "first" and "second", are only used for descriptive purposes, and cannot be understood as indicating or implying the importance of the relativity or implicitly indicating the number of indicated technical features. Therefore, the feature defined with "first" and "second" may explicitly or implicitly comprises one or more of these features. In the description of the present application, unless otherwise specified, "plurality" means two or more.

In the description of the present application, it should be noted that, unless otherwise clearly specified and limited, the terms, "installation", "connection" and "connected" should be understood in a broad sense, and for example, it can be a fixed connection, a detachable connection or an integral connection. It can be a direct connection, or indirect connection through an intermediate medium. It can be the internal communication between two components. For those skilled in the art, the specific meaning of the above-mentioned terms in the present application can be understood under specific conditions.

In the description of this specification, specific features, structures, materials or characteristics can be combined in any one or more embodiments or examples in a suitable manner.

It should be understood that although the various steps in the flowchart of the drawings are displayed in sequence as indicated by the arrows, these steps are not necessarily performed in sequence in the order indicated by the arrows. Unless clearly described to be in the order herein, the execution of these steps is not strictly limited to the order, and they can be executed in other orders. Moreover, at least part of the steps in the flowchart of the drawings may comprise plural sub-steps or plural stages. These sub-steps or stages are not necessarily executed at the same time, but can be executed at different timings, and it is not necessary that the steps are performed sequentially in that order, but may be performed alternately with other steps, or sub-steps of other steps, or at least a part of stages of other steps.

Finally, it should be noted that the above embodiments are only used to illustrate the technical solutions of the present application, not to limit the present application. Although the present application has been described in detail with reference to the foregoing embodiments, those skilled in the art should understand that: it is still possible to modify the technical solutions described in the foregoing embodiments, or equivalently replace some or all of the technical features thereof. These modifications or replacements do not make the essence of the corresponding technical solutions deviate from the scope of the technical solutions of the embodiments of the present application.

REFERENCE NUMBERS

1—touch control substrate; 1a—first patterned area; 1b—second patterned area;
100—substrate;
200—nano conductive layer; 200a—nano conductive material; 200b—matrix layer; 201—nano conductive structure;
300—first protection medium;
400—frame lead layer; 401—frame lead structure;
500—second protection medium;
600—first transparent optical adhesive layer; 610—second transparent optical adhesive layer; 620—third transparent optical adhesive layer;
700—cover plate.

What is claimed is:

1. A touch control substrate, comprising:
a substrate, the substrate comprising a conductive functional area and a frame lead area;
a conductive functional layer, wherein the conductive functional layer is placed on one side of the substrate; the conductive functional layer comprises a patterned nano conductive structure, a patterned first protection medium and a patterned frame lead structure; the patterned first protection medium and the patterned nano conductive structure are arranged in a same layer, and the patterned nano conductive structure is partially embedded in the patterned first protection medium; the patterned frame lead structure is arranged in an area of the patterned nano conductive structure corresponding to the frame lead area and is in direct electrical contact with the patterned nano conductive structure; and an area of the conductive functional layer corresponding to the conductive functional area comprises a first patterned area; and
a second protection medium, which covers at least a surface of the patterned nano conductive structure located in the conductive functional area, and fills a space of first patterned area.

2. The touch control substrate according to claim 1, wherein an area of the conductive functional layer corresponding to the frame lead area comprises a second patterned area; and the second protection medium covers a surface of the patterned frame lead structure and fills a space of the second patterned area.

3. The touch control substrate according to claim 1, wherein the patterned nano conductive structure comprises a nano conductive material, and a part of the nano conductive material is embedded in the patterned first protection medium.

4. The touch control substrate according to claim 3, wherein the nano conductive material comprises: nano silver wires, nano scale metal grids, or nano scale transparent electrode particles.

5. The touch control substrate according to claim 1, wherein a size of the patterned nano conductive structure along a direction perpendicular to the substrate is larger than that of the patterned first protection medium along a direction perpendicular to the substrate, and a plane on which a side of the patterned nano conductive structure away from the substrate is located and a plane on which a side of the patterned first protection medium away from the substrate is located have a predetermined spacing therebetween, and the predetermined spacing is 10 nanometers to 300 nanometers.

6. The touch control substrate according to claim 1, wherein the patterned first protection medium and the second protection medium both comprise transparent water-resistant materials which are neutral or have low acid content.

7. The touch control substrate according to claim 6, wherein a material of the first protection medium and/or the second protection medium comprises acrylate or silicon dioxide.

8. The touch control substrate according to claim 1, wherein a material of the frame lead structure comprises nano silver paste, copper or graphene; and/or a size of the frame lead structure along a direction perpendicular to the substrate is 0.1 μm to 2 μm.

9. A touch control module, the touch control module comprising: a cover plate and one touch control substrate according to claim 1, wherein the cover plate is arranged on one side of the second protection medium included in the touch control substrate, which side is away from the substrate included in the touch control substrate, and the cover plate is installed as aligned with the touch control substrate, through a first transparent optical adhesive layer.

10. A method for preparing a touch control substrate according to claim 1, comprising steps of:
providing a substrate, wherein the substrate is defined to have a conductive functional area and a frame lead area;
preparing a nano conductive layer on one side of the substrate;
coating a first protection coating on one side of the nano conductive layer away from the substrate, wherein the first protection coating permeates to an inside of the nano conductive layer and forms a first protection medium after curing;
preparing a frame lead layer on an area on one side of the nano conductive layer away from the substrate and corresponding to the frame lead area;
patterning the nano conductive layer, the first protection medium and the frame lead layer to form a conductive functional layer comprising the patterned nano conductive structure, the patterned first protection medium and the patterned frame lead structure, wherein an area of the conductive functional layer corresponding to the conductive functional area comprises a first patterned area; and
preparing a second protection medium on one side of the conductive functional layer away from the substrate, wherein the second protection medium at least covers the surface of the patterned nano conductive structure located in the conductive functional area and fills the space of the first patterned area.

11. The method for preparing a touch control substrate according to claim 10, wherein the step of preparing a nano conductive layer on one side of the substrate comprises: forming one layer of nano material solution coating on one side of the substrate, wherein the nano material solution coating comprises nano conductive materials and a matrix solvent; and curing the nano material solution coating so as to form the nano conductive layer.

12. The touch control substrate according to claim 2, wherein a size of the patterned nano conductive structure along a direction perpendicular to the substrate is larger than that of the patterned first protection medium along a direction perpendicular to the substrate, and a plane on which a side of the patterned nano conductive structure away from the substrate is located and a plane on which a side of the patterned first protection medium away from the substrate is located have a predetermined spacing therebetween, and the predetermined spacing is 10 nanometers to 300 nanometers.

13. The touch control substrate according to claim 3, wherein a size of the patterned nano conductive structure along a direction perpendicular to the substrate is larger than that of the patterned first protection medium along a direction perpendicular to the substrate, and a plane on which a side of the patterned nano conductive structure away from the substrate is located and a plane on which a side of the patterned first protection medium away from the substrate is located have a predetermined spacing therebetween, and the predetermined spacing is 10 nanometers to 300 nanometers.

14. The touch control substrate according to claim 4, wherein a size of the patterned nano conductive structure along a direction perpendicular to the substrate is larger than that of the patterned first protection medium along a direction perpendicular to the substrate, and a plane on which a side of the patterned nano conductive structure away from the substrate is located and a plane on which a side of the patterned first protection medium away from the substrate is located have a predetermined spacing therebetween, and the predetermined spacing is 10 nanometers to 300 nanometers.

15. The touch control module according to claim 9, wherein an area of the conductive functional layer corresponding to the frame lead area comprises a second patterned area; and the second protection medium covers a surface of the patterned frame lead structure and fills a space of the second patterned area.

16. The touch control module according to claim 9, wherein a size of the patterned nano conductive structure along a direction perpendicular to the substrate is larger than that of the patterned first protection medium along a direction perpendicular to the substrate, and a plane on which a side of the patterned nano conductive structure away from the substrate is located and a plane on which a side of the patterned first protection medium away from the substrate is located have a predetermined spacing therebetween, and the predetermined spacing is 10 nanometers to 300 nanometers.

17. The touch control module according to claim 9, wherein the patterned first protection medium and the second protection medium both comprise transparent water-resistant materials which are neutral or have low acid content.

18. A touch control module, the touch control module comprising: a cover plate and two touch control substrates according to claim 1, wherein the two touch control substrates are arranged as stacked, and the cover plate is arranged on one side of the second protection medium included in the touch control substrate close to an outer layer, which side is away from the substrate included in the touch control substrate; the cover plate is installed as aligned with the touch control substrate close to the outer layer, through a second transparent optical adhesive layer; and the substrate included in the touch control substrate close to the outer layer is installed as aligned with the touch control substrate close to an inner layer through a third transparent optical adhesive layer.

19. The touch control module according to claim 18, wherein an area of the conductive functional layer corresponding to the frame lead area comprises a second patterned area; and the second protection medium covers a surface of the patterned frame lead structure and fills a space of the second patterned area.

20. The touch control module according to claim 18, wherein a size of the patterned nano conductive structure along a direction perpendicular to the substrate is larger than that of the patterned first protection medium along a direction perpendicular to the substrate, and a plane on which a side of the patterned nano conductive structure away from the substrate is located and a plane on which a side of the patterned first protection medium away from the substrate is located have a predetermined spacing therebetween, and the predetermined spacing is 10 nanometers to 300 nanometers.

* * * * *